No. 709,363. Patented Sept. 16, 1902.
A. C. SCHUMAN.
COMPUTING MACHINE.
(Application filed Dec. 19, 1901.)
(No Model.) 8 Sheets—Sheet 5.
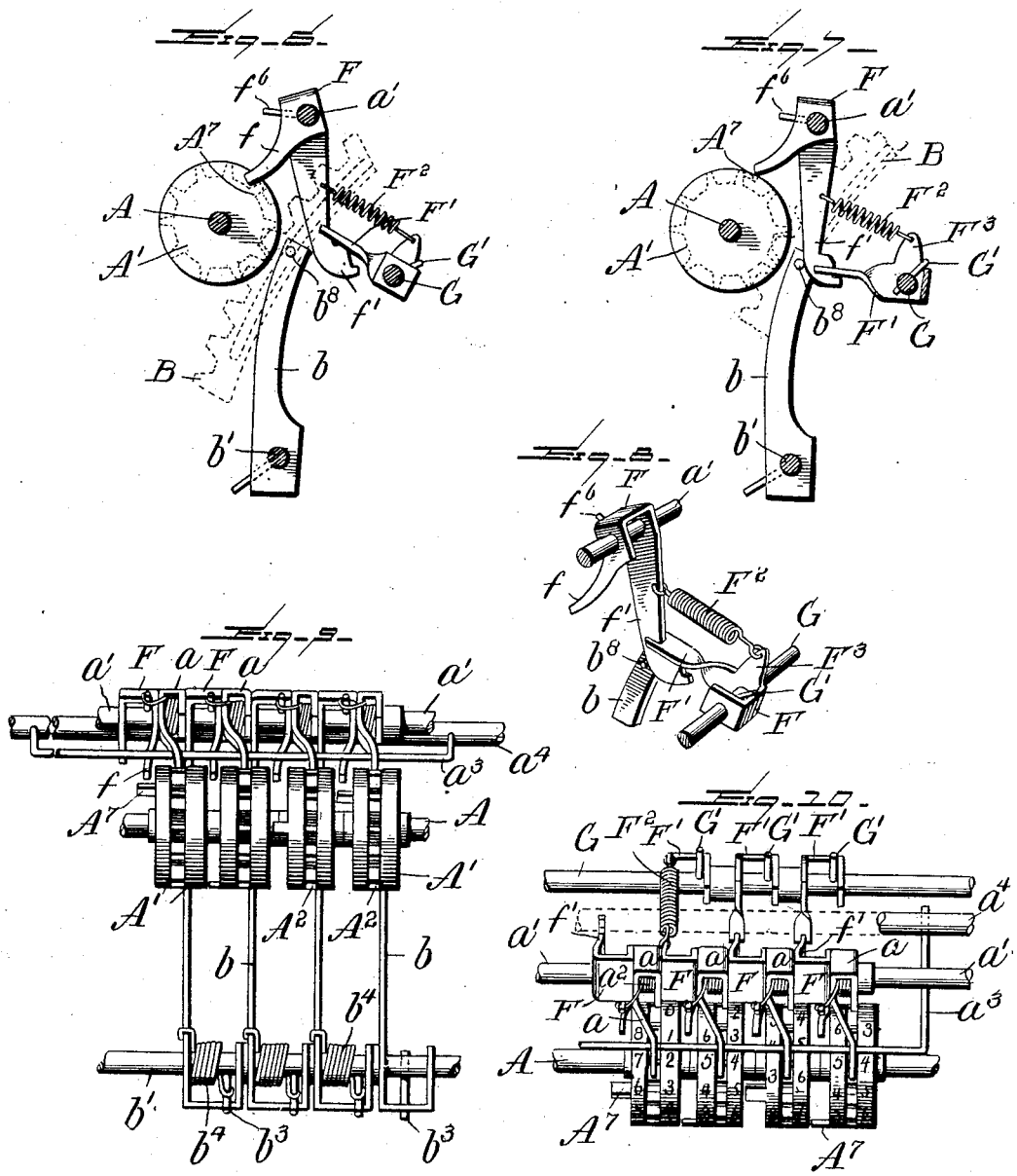

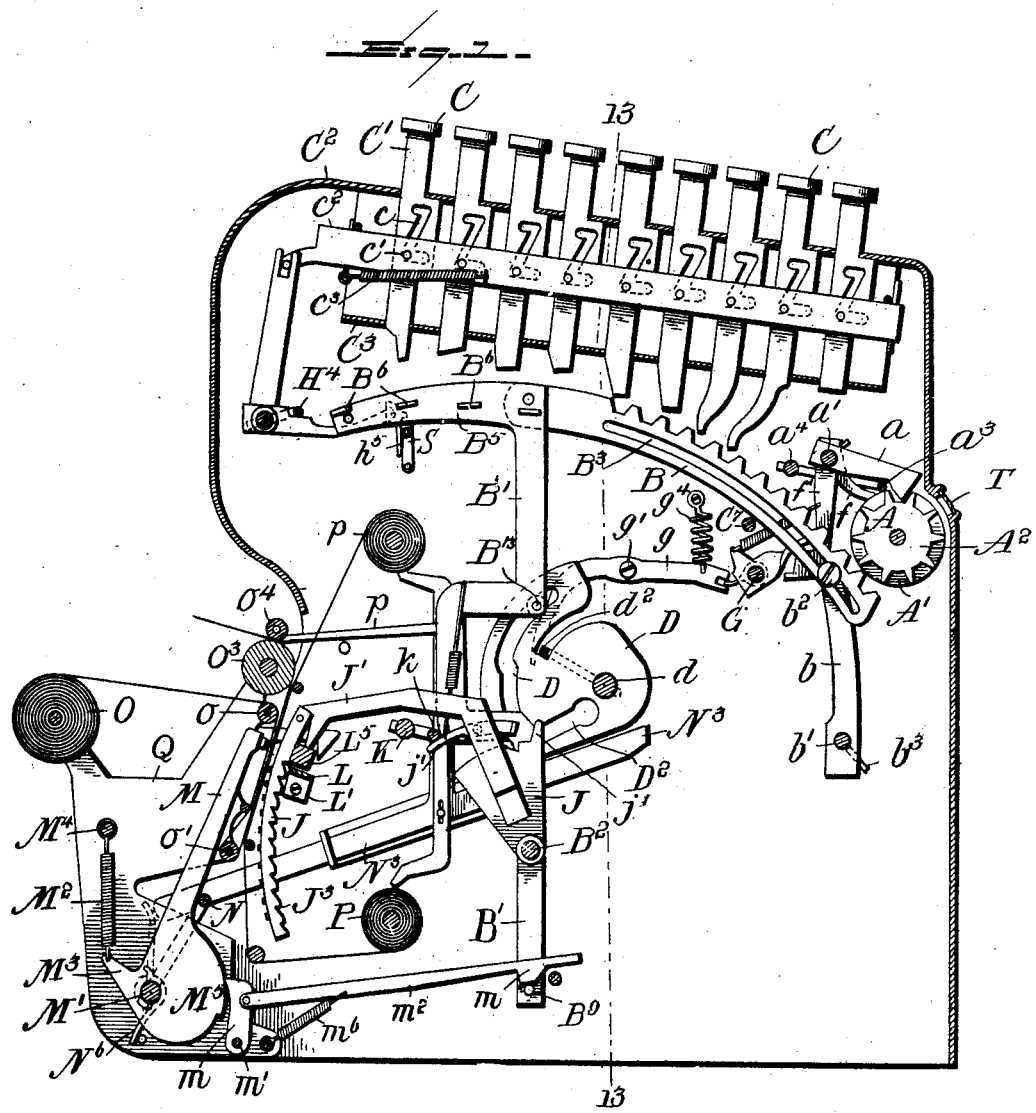

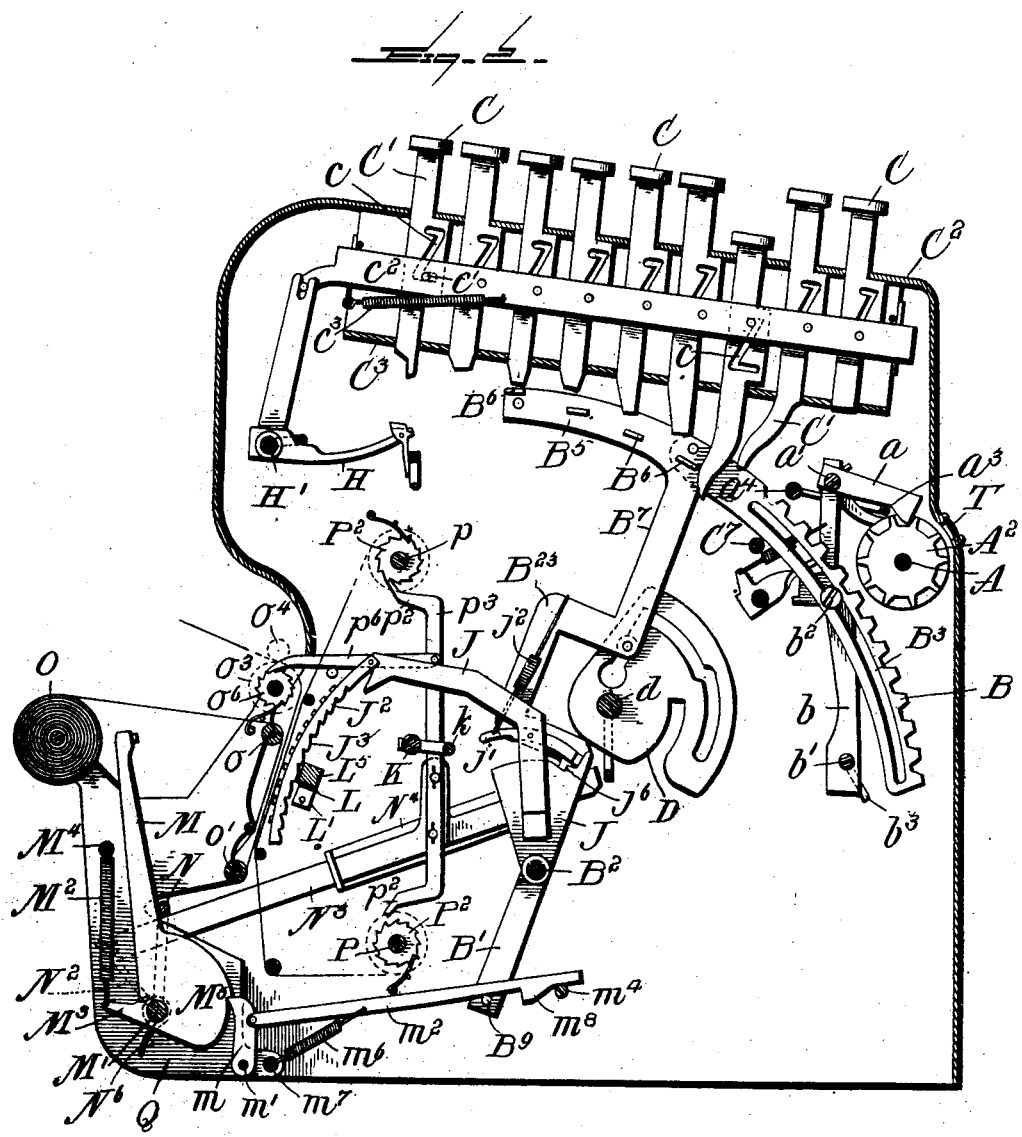

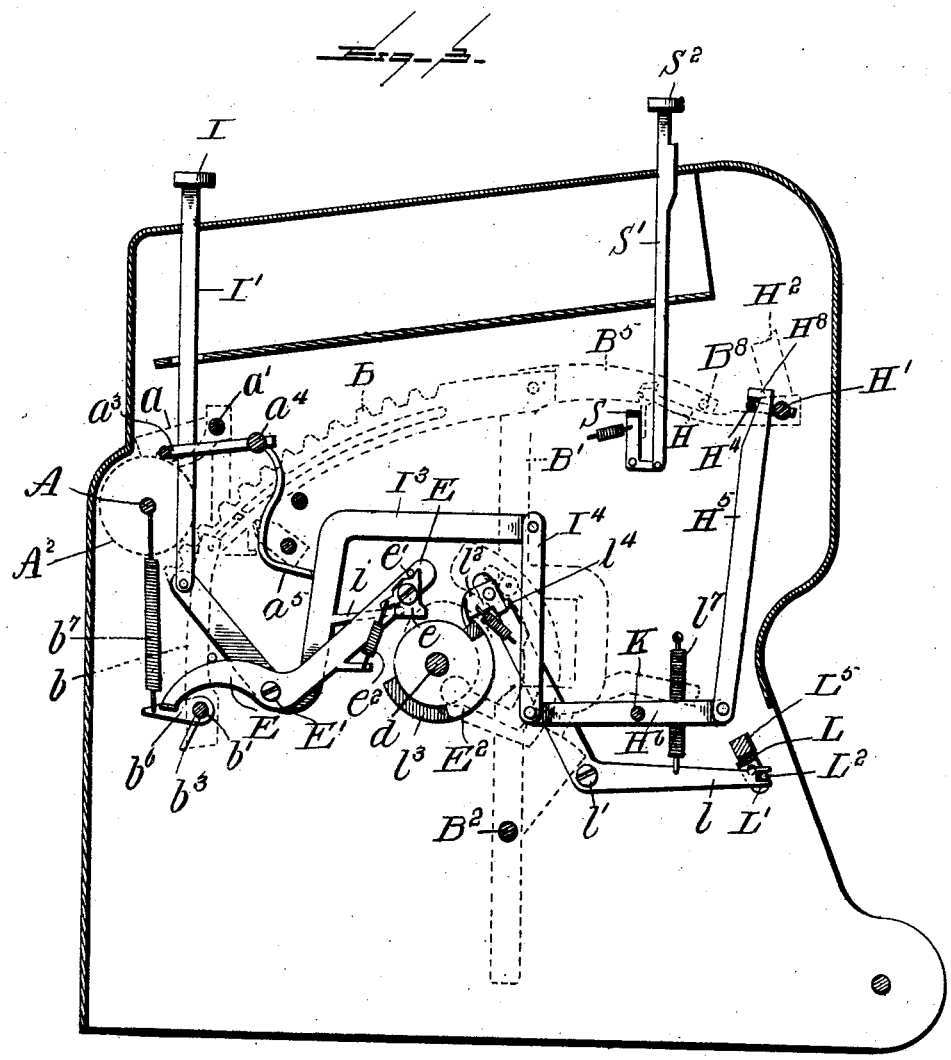

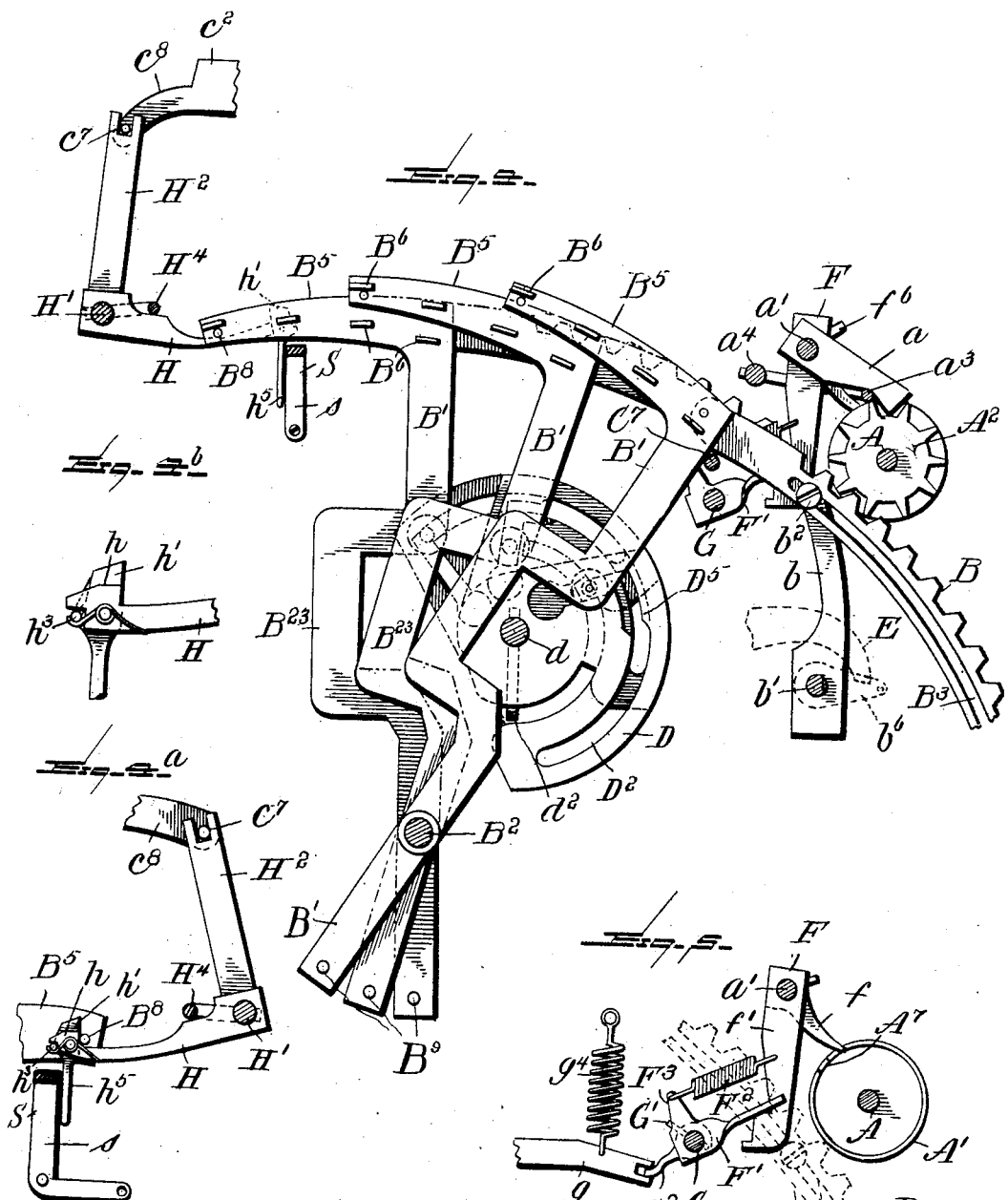

No. 709,363. Patented Sept. 16, 1902.
A. C. SCHUMAN.
COMPUTING MACHINE.
(Application filed Dec. 19, 1901.)
(No Model.) 8 Sheets—Sheet 6.
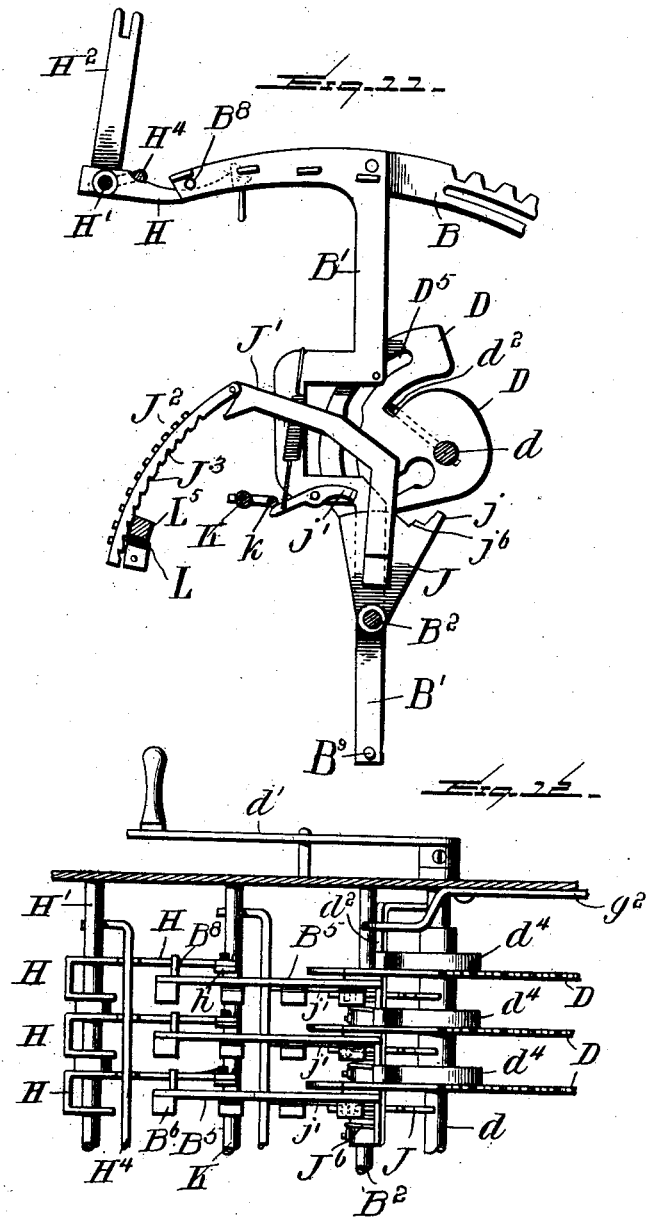

No. 709,363. Patented Sept. 16, 1902.
A. C. SCHUMAN.
COMPUTING MACHINE.
(Application filed Dec. 19, 1901.)
(No Model.) 8 Sheets—Sheet 7.
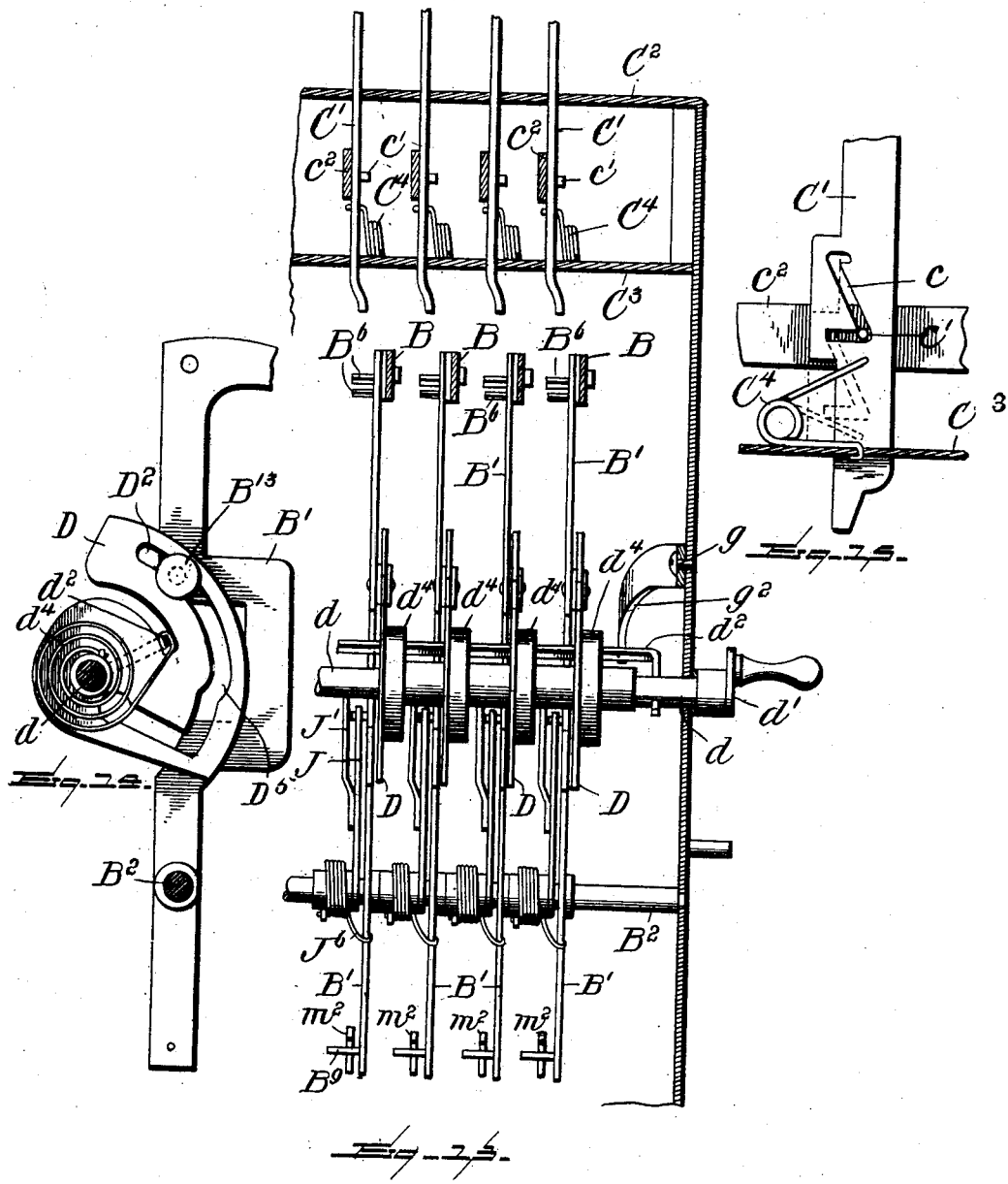
WITNESSES:
INVENTOR
Alexander C. Schuman.
BY
Alexander & Powell.
Attorneys

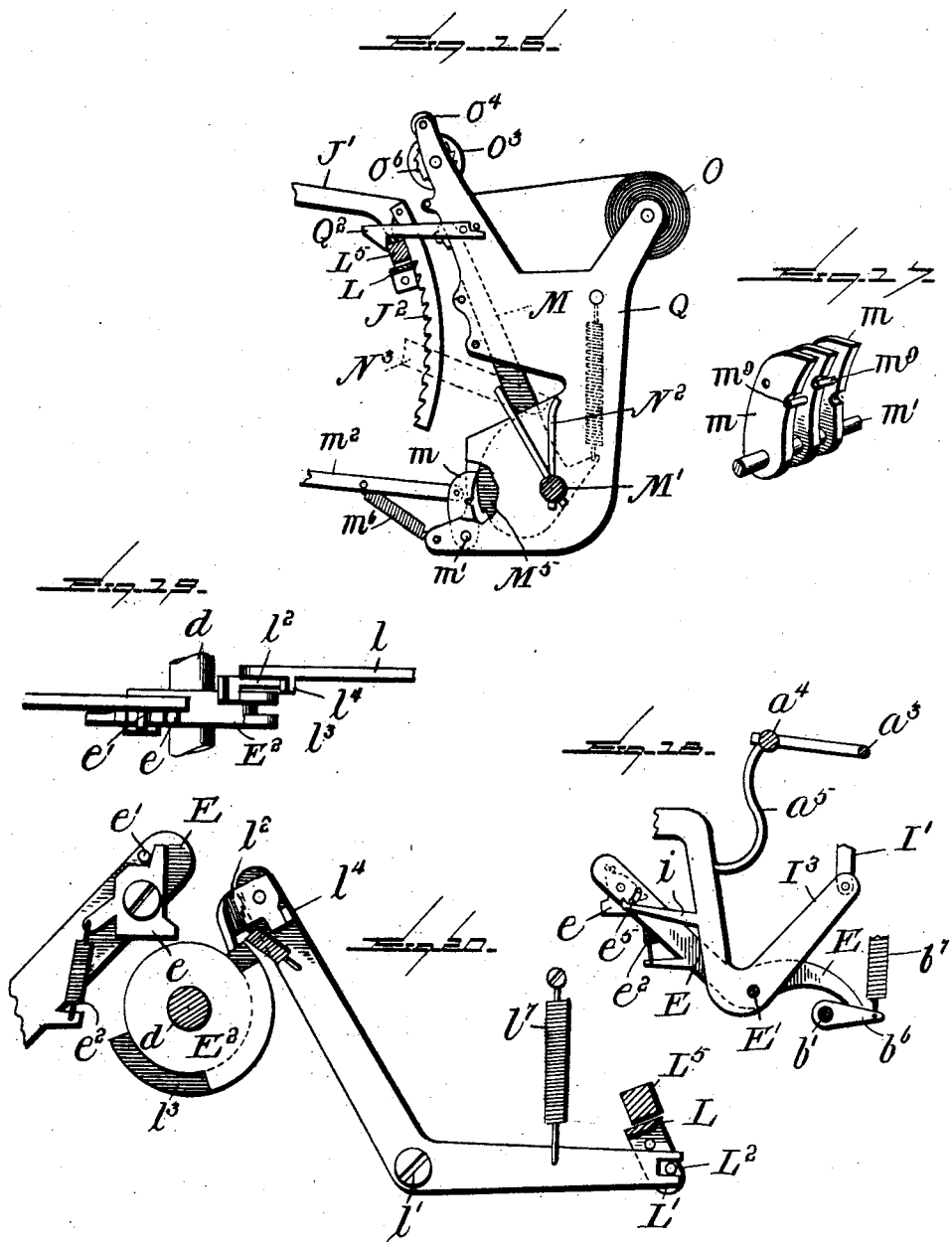

UNITED STATES PATENT OFFICE.

ALEXANDER C. SCHUMAN, OF LOUISVILLE, KENTUCKY, ASSIGNOR TO SPALDING COLEMAN, OF LOUISVILLE, KENTUCKY.

COMPUTING-MACHINE.

SPECIFICATION forming part of Letters Patent No. 709,363, dated September 16, 1902.

Application filed December 19, 1901. Serial No. 86,514. (No model.)

*To all whom it may concern:*

Be it known that I, ALEXANDER C. SCHUMAN, of Louisville, in the county of Jefferson and State of Kentucky, have invented certain new and useful Improvements in Computing-Machines; and I hereby declare that the following is a full, clear, and exact description thereof, reference being had to the accompanying drawings, which form part of this specification.

This invention is an improved computing-machine for use in arithmetical calculations to be used in banks, stores, and other places where a large number of figures or small items are to be recorded or computed.

The objects of the invention are to provide a perfectly-reliable computing-machine which can be usefully employed in addition, multiplication, subtraction, and division, the operator having only to follow certain simple rules in order to effect any of these computations rapidly and easily, the only manual operations required being first the depression of proper keys on the keyboard and then the oscillation of a vibrating lever, which latter controls and causes the operation of all the other parts of the machine.

Another object is to provide the machine with a simple printing mechanism, whereby a printed record can be kept of every item or operation performed in the machine.

Another object is to provide a "total-key," by which the operator at any time can obtain the total of any number of items recorded in the machine. Further, the machine is provided with a repeating-key, by which the operation of multiplying and dividing is facilitated, the operator having simply to set the keys once for the number to be multiplied or divided and then hold down the repeater-key and move the rock-shaft the number of times the sum indicated is to be multiplied, as hereinafter explained.

In place of here attempting to summarize all the novel and important features of the invention I refer to the claims following the detailed description thereof, wherein all the features and combinations for which I desire protection are severally set forth, and I will now describe the invention with reference to the accompanying drawings, which will assist in imparting a clear and full understanding thereof, it being understood that the said drawings illustrate the machine in the best form now known to me, but which is susceptible of numerous variations and improvements in forms and arrangements of parts without departing from the substance of the invention, and therefore I exhibit such drawings as illustrative of the invention and not as the final or restrictive embodiment thereof.

Referring to the accompanying drawings, Figure 1 is a longitudinal vertical section through the complete machine, showing the parts in normal position. Fig. 2 is a similar section showing the parts in position assumed just prior to the actual registering and printing operations. Fig. 3 is a similar view looking toward the opposite side of the machine. Fig. 4 is a detail view showing different positions assumed by segments and levers. Figs. $4^a$ and $4^b$ are detail views of one of the lever-catches. Fig. 5 is a detail view of the auxiliary or "carry-over" devices for holding the segments in mesh with registering or number wheels. Figs. 6 and 7 are detail views of such auxiliary devices for holding the segments in mesh, showing them in set and in tripped position. Fig. 8 is a perspective view of one of the trip-levers F and connections. Fig. 9 is a detail front view of the registering-wheels and connections. Fig. 10 is a top view of parts shown in Fig. 9. Fig. 11 is a detail view showing the positions of the lever and segment relative to the type-bar prior to the printing operation. Fig. 12 is a detail top plan view of the parts shown in Fig. 11. Fig. 13 is a detail vertical section on line 13 13, Fig. 1. Fig. 14 is a detail view of one of the levers and cam and spring for actuating the same. Fig. 15 is an enlarged detail view of a key and key-lock. Fig. 16 is a detail view of the printing mechanism detached. Fig. 17 is a detail view of the impression-hammer-locking pawl. Fig. 18 is a detail view of the levers E and $I^3$ and connections. Figs. 19 and 20 are top and side detail views of the cam $E^2$ and $I^3$ and the coacting levers.

Upon a shaft A, supported in a suitable framework, are mounted a series of independent rotatable registering wheels or disks A'. These wheels or disks respectively correspond to and represent "units," "tens," and so on. The first or units wheel has on its peripheral flanges ten equidistant numerals from "0" to "9," inclusive. The other wheels have ten equidistant numerals from "0" to "9," inclusive. Each registering wheel or disk is provided with a small pinion $A^2$, which is engaged by a controlling-pawl $a$, hung upon a transverse shaft $a'$, the tooth of the dog being so shaped that it will ride over the teeth if sufficient pressure is exerted on the pinion, but will hold the latter and attached wheel securely against accidental rotation. The dogs may be held down by springs $a^2$, as indicated in the drawings. Underlying the series of dogs is a lift-rod $a^3$, connected at its ends to a rock-shaft $a^4$, by which the dogs may be simultaneously raised out of engagement with the registering-wheels of number-disks for a purpose hereinafter explained.

A series of toothed segments B, one for each registering-wheel or number-disk A', are pivotally connected at one end to levers B', which are strung on a transverse shaft $B^2$, arranged in the frame below and in rear of the number-disks, while the forward ends of the segments B are supported on upstanding arms $b$, hung on a rock-shaft $b'$ below the number-disks. Each segment has a sliding connection with arm $b$ to permit the segment to slide back and forth past the arm, and, as shown, this connection is formed by a longitudinal slot $B^3$ in the segment transfixed by a pin $b^2$ on the arm, which allows the segment to be reciprocated on the pin without affecting the arm $b$ which supports it. The arms $b$ are pivotally mounted on the shaft $b'$, but are held up against rigid stops $b^3$ on the shaft by means of springs $b^4$. When the shaft $b'$ rocks in one direction, (toward the right, Figs. 1 and 2,) the stops $b^3$ cause the arms $b$ to move with the shaft, throwing the upper ends of the arms toward the number-wheels, and thereby lifting the segments B into mesh with the gears $A^2$, as shown in Fig. 4; but when the shaft $b'$ is returned to normal position, permitting the ends of arms $b$ to move away from the numbering-disks, the segments B are dropped out of mesh with the gears A', as shown in Figs. 1 and 2, unless the backward motion of one or more of the arms is temporarily prevented by devices arranged in rear thereof, as shown in Figs. 1 and 5 to 8.

The levers B' are rocked or vibrated so as to reciprocate the segments B by means of cam-plates D on a rock-shaft $d$, journaled in the frame in front of and above shaft $B^2$ and provided on one end with an operating-handle $d'$, by which the shaft can be rocked by hand. These cam-plates D are hung loosely on the shaft $d$, but are normally thrown forward against a stop-bar $d^2$, attached to the shaft, by means of suitable springs, convolute springs $d^4$ being shown, one for and beside each cam-plate, having one end fast to the shaft and the other to the plate. The springs tend to rock the cam-plates D and levers B' toward the number-disks A', and the stop-bar $d^2$ is arranged to cause the cam-plates to positively move the levers B' away from the number-disks when the shaft $d$ is returned to normal position. Each cam-plate D has an irregular cam-slot $D^2$ in it which is engaged by a pin $B^{13}$ on the adjoining lever B', the cam-slot being formed to compensate for the different centers on which the lever and plate move, so that the levers can be rocked by the plates without any binding. The cam-slots $D^2$ in the plates operating the segments of the tens, hundreds, and higher denominations of number-disks also have dwell portions $D^5$ on them with which pins $B^{13}$ engage when and after the segments B have been moved back almost to normal position or to the ninth notch or tooth. Then the dwells of the several cams are so arranged and proportioned that the segments B will move the distance of the final or "carrying" notch or tooth in succession. In other words, the segments if displaced will be moved back simultaneously nearly to normal position. Then the segments for the tens, hundreds, and greater denominations will complete their backward movement successively in the order named to permit "carrying over," as hereinafter explained. The levers B' may be bowed or slotted, as indicated at $B^{23}$, to allow the upper part of the lever to swing past the shaft $d$, if permitted to do so.

The forward swing of the levers B' and consequent movement of the segments B is controlled by stop-keys, there being a series of nine stop-keys C to control the movement of each lever B. These stop-keys are arranged in a row located above and in the vertical plane of the movement of the related segment and lever, as shown, and by depressing any one of these keys the forward movement of the related lever and segment can be thereby arrested. These keys preferably have flat stems C', which extend through guide-openings in the top and bottom plates $C^2$ $C^3$ of the keyboard, each key being pressed upward by a spring $C^4$ and each key-stem having a Z-shaped slot $c$ in it which engages a pin $c'$, projecting from the side of a longitudinally-movable key lock-bar $c^2$, which extends beside the row of key-stems, as shown in Figs. 1 and 2, and is normally pulled outwardly by a spring $c^3$, so as to keep pins $c'$ normally against the lower end of the central inclined portions of the slots $c$, as shown in Figs. 1 and 15, so that any key can be depressed. Upon the depression of a key, however, the cam action of the inclined portion of its slot $c$ on the pin $c'$ moves bar $c^2$ longitudinally, so that the other pins $c'$ thereon engage the lower horizontal portion of the slots $c$ in the upstanding keys, as indicated in Fig. 2. The upper horizontal parts of slots $c$ are shorter than the lower horizontal portions thereof. Consequently although when the key is fully depressed spring $c^3$ pulls the bar $c^2$ forward, so as to engage pin $c'$ in the upper part of the slot in the depressed key and lock this key in lowered position, yet bar $c^2$ cannot then move sufficiently forward to disengage its other pins $c'$ from the lower horizontal positions of the slots in the other raised key-stems. Therefore such other key-stems cannot be depressed until bar $c^2$ and the depressed key are returned to normal position. To permit this, it is first necessary to push bar $c^2$ forward so that the upper horizontal position of the slot in the depressed key-stem is disengaged from the pin, permitting the spring to lift the key, and then when the bar is released the parts assume the normal position shown in Fig. 1, when any key can be depressed. Thus when any key is depressed it effects the automatic locking of the other keys, so that false movement of the relative segment $B'$ is prevented.

The key-stems depend below the plate $C^3$, and when a key is depressed its lower end will project below the tops of the related segment B and levers $B'$ and close thereto in position to be engaged by one of the laterally-projecting lugs $B^6$ on the segmental head $B^5$ of the related lever. It will be observed by reference to Figs. 1 and 2 that the levers B have segmental rearwardly-extending heads or projections $B^5$ on their upper ends, from which several lugs $B^6$ project, these lugs being spaced apart and located at successively different distances from the pivot $B^2$ of the lever. These lugs are adapted to engage the inner ends of depressed key-stems, and by arranging the lugs at different distances from the center or axis $B^2$, I am enabled to shorten the travel of the segment the distance between the two extreme lugs $B^6$ on the head $B^5$, for if but one stop-lug $B^6$ were used the lever $B'$ and segment would have to vibrate through an arc equal in length to the distance between the lower ends of the first and eighth key-stems $C'$; but by having the series of lugs $B^6$ arranged to engage successively-removed key-stems I shorten the arc of movement of the segment and lever to an extent equal to the distance between the rearmost and foremost lugs. The lugs are placed successively nearer the axis, so that forward lugs will not contact with the stems of keys adapted to engage rear lugs, but will pass thereunder. In the construction shown four lugs $B^6$ are shown, the first being adapted to engage the stems of the first two keys, the second lug the stems of the third and fourth keys, the third lug the stems of the fifth and sixth keys, and the fourth the stems of the seventh and eighth keys. It is unnecessary to make the stem of the ninth key engage the segment or head, because all the levers $B'$ can bring up, when the ninth key is depressed, against a common stop-bar $C^7$, arranged below the segments, as shown.

In the normal operation of the machine when "adding" numbers after the keys are depressed the shaft $d$ is turned so as to permit the levers $B'$ and segments B to swing forward or to the right, at which time the segments are out of mesh with pinions $A^2$, as in Figs. 1 and 2. On the initial reverse movement of the shaft and before the segments B start backward the shaft $b'$, carrying arms $b$, is rocked, so as to cause the arms to lift the segments B into mesh with the pinions $A^2$ of the numbered wheels, by the following devices: On the shaft $b'$ is a crank-arm $b^6$, to which is connected at one end a spring $b^7$, having its other end fast to the frame, (see Fig. 3,) by which the shaft $b'$ and arms $b$ are normally rocked away from the number-wheels, so as to hold the segments B out of mesh with pinions $A^2$. Upon this arm $b^6$ impinges the forward end of an oscillating lever E, pivoted on a pin $E'$ in rear of shaft $b'$, the rear end of said lever extending toward shaft $d$ and being adapted to engage a cam $E^2$ on said shaft, by which said lever E is rocked, so as to rock shaft $b'$ and arms $b$ and throw the segments B into mesh with the pinions $A^2$, as shown in Fig. 4, cam $E^2$ being of such size and so located on shaft $d$ that the segments will be kept in mesh until they are returned from their lowermost to the "ninth" or "carrying" positions, as above explained, at which point the cam $E^2$ will disengage the lever and arms $b$ will be thrown back, (unless detained by an auxiliary device hereinafter described,) disengaging the segments from the pinions.

The cam $E^2$ must actuate lever E only when moving in one direction—i. e., during the back stroke of the actuating-handle—and to prevent the cam shifting the lever on the forward stroke a dog $e$ is pivoted to the end of lever E and projects therefrom in position to engage cam $E^2$. During the forward stroke of the actuating-handle the dog yields and rides over cam $E^2$ without the latter affecting the lever E. On the return movement of the cam, however, the dog is arrested by a pin $e'$ on the lever, and the cam then forces the dog away from shaft $d$, thereby rocking lever E and causing it to throw and hold the segments B in mesh with gears $A^2$, as described, until the cam passes from beneath the dog $e$. The dog $e$ is normally held against stop $e'$ by a spring $e^2$. (See Figs. 3 and 18.)

Before proceeding with the explanation of further mechanism it will simplify the comprehension thereof if the following facts be borne in mind.

The units number-disk bears ten numerals; but its coacting segment in a complete stroke in mesh therewith can only rotate the units-disk nine-tenths of one revolution. If the total of two consecutive numbers registered by the units-disk amounts to more than ten, then the tens-disk must be moved one notch to carry over ten from the units-disk. When the totals registered on the tens-disk equal or exceed one hundred, then the one hundred must be carried over to the hundreds-disk. The tens, hundreds, and higher denomination disks will also have to carry over at times. For example, supposing the operations have been such that the number "999" has been added, in which case the units, tens, and hundreds disks would each show "9" at the reading-point. Now if one hundred and eleven is to be added the proper keys for the tens, units, and hundreds are depressed. The addition of one to the units necessitates carrying over to the tens-disk, the addition of twenty to the tens necessitates carrying over to the hundreds-disk, and the total carrying over of two hundred to the hundreds-disk necessitates carrying over the one thousand to the "thousands-disk," so that the total shown at the reading-disk will be "1110." These operations require that the tens and hundreds disk both move two notches (although only the "1" key thereof has been depressed) and the thousands-disk to move one notch, although no key has been depressed. Therefore the parts are so constructed that the segments operating the units, hundreds, and higher denomination disks are permitted a movement sufficient (if kept in mesh with the pinions $A^2$ during the entire return stroke thereof) to move the disk ten notches (or one complete revolution) instead of but nine notches, (or nine-tenths of a revolution,) and whether any key be depressed in the tens or higher denomination rows the segments for the tens and higher denomination all make a reciprocation sufficient to move their respective disks one notch (if the segments are kept in mesh with the disks) every time the shaft $d$ is rocked. This motion of the segments I term the "carrying" motion, which is additional to the "key-controlled" motion. This carrying motion is caused by what might be termed the "tenth tooth" of the segments; but the segments are normally thrown out of mesh with pinions $A^2$ at the ninth tooth or ninth notch, (unless detained by the auxiliary carry-over devices hereinafter explained,) so that this extra carrying motion of the segments is normally ineffective upon the pinions and number-disks.

The auxiliary devices for detaining the arms $b$ so as to keep the segments B in mesh with pinions $A^2$ during such carrying-over movements only come into action when a number is to be carried over from one disk to another—as, for example, if the tens-disk makes a complete revolution then the hundreds-disk must move one notch. Now when the segments have been moved back to the ninth tooth the cam $E^2$ disengages lever E and allows arms $b$ to drop the segments out of mesh; but where carrying over is to be effected the proper arms $b$ are temporarily held up to keep the proper segment in mesh until it moves the coacting disk another notch, thus carrying over the proper number. These devices for holding the arms $b$ temporarily during the carrying-over operations are shown more clearly in Figs. 4 to 10 and are as follows: On the shaft $a'$, upon which dogs $a$ are hung, are suspended double-armed levers F, which are provided with forwardly-projecting arms $f$, that extend beside the related number-disk $A'$ in position to be engaged by a lateral lug $A^7$ thereon. The other arm $f'$ of the lever depends beside the disk to and below the head of the arm $b$, supporting the segment B of the adjoining disk of higher denomination. For example, the lever F, whose arm $f$ engages the lug $A^7$ of the units-disk, has its arm $f'$ depending beside the arm $b$, which supports the segment $B'$ of the tens-disk. The lower end of arm $f'$ lies behind a pin $b^3$ on the adjoining arm $b$ and may be held thereagainst, so as to lock arm $b$, as shown in Fig. 7. In rear of the arm $f'$ of each lever F is a dog $F'$, loosely pivoted on a shaft G, the forward end of the dog $F'$ being preferably bifurcated to loosely embrace the edge of the arm $f'$, with which it coacts. A spring $F^2$ is strung between a lug $F^3$ on the dog and the arm $f'$, which spring serves the double purpose of drawing the dog toward the bottom of the arm $f'$ and of normally holding lever F in position to have its arm $f$ struck by lug $A^7$. The inward movements of the levers F by springs $F^2$ is limited by stops $f^6$ on shaft $a'$, as shown. The dogs $F'$ are loose on shaft G; but the latter is provided with stops or pins $G'$, which are adapted to raise the dogs into the position shown in Fig. 6 when the shaft G is rocked backward. This shaft G is rocked backward at the proper time (just after the segments B have completed their return stroke) by means of the lever $g$, which is supported on a pivot-pin $g'$. The front end of lever $g$ engages an arm $G^2$ on shaft G, and the inner end $g^2$ of lever $g$ depends into the path of the stop-bar $d^2$ on shaft $d$, which stop-bar acts as a cam and engages the end $g^2$ of lever $g$ at the proper time, as indicated in Figs. 1, 5, and 13, and rocks said lever, causing it to rock shaft G and cause the latter to throw dogs $F'$ upward, releasing arms $f'$, so that springs $F^2$ can pull them away from arms $b$ and permit the latter to drop and draw segment B out of mesh with the pinion $A^2$. (See Figs. 6 and 7.) Lever $g$ is acted upon by a spring $g^4$, which after the bar $d^2$ releases lever $g$ (on the forward stroke of the segments) causes the lever to rock shaft G and move pins $G'$ from the dogs, so the latter will be free to drop if levers F be tripped by the lugs $A^7$. The operation of these carrying-over devices is as follows: The levers F and dogs $F'$ normally assume the positions shown in Fig. 6, and when the arms $b$ throw the segments into mesh with pinions $A^2$ the levers F and dogs $F'$ are undisturbed unless a carry over is to be effected. For example, suppose a number is to be carried over from units to tens. In that event during the back stroke of the segments B and while they are held in mesh with the pinions $A^2$, as shown in Figs. 4, 6, and 7, the lug $A^7$ on the units-disk $A'$ strikes the arm $f$ of the adjacent lever F and rocks said lever, swinging its arm $f'$ outward and against the pin $b^8$ on the arm $b$, which is holding the segment in mesh with the pinion $A^2$ of the tens-disk A', and this outward movement of arm $f'$ allows its dog F' to drop down behind it, as shown in Fig. 7, locking the lever F and arm $b$ in this position, so that when shaft $b'$ is rocked to cause arms $b$ to drop the segments out of mesh with the pinions this particular arm $b$ will be held and keep its segment in mesh until the latter is moved fully backward and has made the carry-over stroke. Thus the carrying over from the units to the tens disk is effected. In like manner the carrying over from any other disk to the one of next higher denomination can be effected. Just as the segments complete their return stroke bar $d^2$ strikes end $g^2$ of lever $g$, rocking the lever and causing it to rock shaft G, whereupon pins G' force dogs F' to release levers F and the latter release arms $b$, whereupon the tens-segment is dropped out of mesh, and the parts F F' return to the position shown in Fig. 6 and the parts $b$ B to the position shown in Figs. 1 and 2.

The possibility of carrying over being necessary at any time requires that all the segments shall make a carry-over stroke at each operation of the rock-shaft $d$ whether their relative keys be depressed or not. This movement is permitted and controlled by the following devices, (see Figs. 1 to $4^a$ and 12:) A series of catches H are pivoted loosely on a shaft H' just in rear of the heads $B^5$ of the levers B' when the latter are in their rearmost position. (See Figs. 1 and 4.) There is one catch H for every lever B', such catch being adapted to engage a stop-pin $B^8$, attached to the head $B^5$, as shown. These catches have shallow hooks $h$ on their inner ends, which stand in the path of pins $B^8$ when the catches are in normal position, so that when the rock-shaft $d$ is actuated to throw the segments forward these catches will arrest the forward movement of the relative segment (unless the catch has been depressed, as hereinafter explained) after it has moved the distance of one tooth (the tenth or carrying tooth) and hold it thus until the shaft $d'$ is moved back to return the segments to normal position. In Fig. 1 the lever B' is shown in such position, and when shaft $b'$ is rocked the segment B, attached to said lever, would be lifted so as to engage its "tenth" or "carrying" tooth with the gear $A^2$, and if the lever F should be tripped so as to lock the arm $b$, as above described, it would result that during the limited backward movement of said lever B' the segment would impart a movement of one notch to the pinion $A^2$, although the lever B' had not been released by any key. If the lever F, however, is not tripped, as above described, the segment would be dropped out of mesh with the pinion before the segment was moved back, and no registering or carrying-over operation would be performed by such segment.

Owing to the dwell portion of cams D the carrying is done successively. For example, if six thousand six hundred and sixty-six is to be added to three thousand three hundred and thirty-four the unit-segment will set the tens-carrying device by the pin or lug $A^7$ on cog-wheel disk A', pushing or lifting F so F' can drop behind F, which will prevent tens-segment from unmeshing from its cog-wheel $A^2$ until the last or carrying tooth on said segment has made one or tens number disk; (but if the tens-disk has nothing to carry over the segment would unmesh when it arrived at the carrying-tooth, as F would not be in position to prevent it.) This would have caused $A^7$ to set the carrying device for the hundreds-disk, and the hundreds-wheel would set the carrying device for the thousands-disk, and so on. The humps on the dwell portion of the cams D are so arranged one behind the other from the lower to the higher denominations that if one is to be added to nine thousand nine hundred and ninety-nine the carrying device of each succeeding disk will have time to be set by the next preceding disk, and the hump on dwell portion of the cam D for such disk is not reached until the disk has had time to be set for carrying. It does not matter at what part of the movement of the segment the carrying device is set, as it remains set until released at the end of return movement of handle.

The several catches H are normally upheld in position to cause their hooks $h$ to catch the pins $B^8$ and stop the forward movement of the segments by means of the arms $H^2$, which are formed with or rigidly connected to the hooks and extend up to the projecting end of the overlying key lock-bar $c^2$ (see Figs. 1 and 4) pertaining to the series of keys which control the respective segment. The upper end of arm $H^2$ is pivotally engaged with a pin $c^7$ on an extension $c^8$ of such bar, as shown, so that when the key lock-bar is shifted forwardly by the depression of a key, as above described, the connected catch H will be rocked sufficiently to move its hook $h$ out of the way of the pin $B^8$, so that the segment can move forward until it is arrested by contact with the depressed key-stem, as above described. This catch-lever H $H^2$, moreover, is used to effect the resetting of the keys in the following simple manner: Pivoted to the hook end $h$ of each catch H is a dog $h'$, whose tooth projects above the catch $h$. The dog projects into the path of the pin $B^8$ even when the catch is depressed, but will yield to the forward movement of pin $B^8$ over hook $h$; but on the return stroke of the segments the dog obstructs the passage of pin $B^8$, a lug $h^3$ on the dog catching under the hook, as indicated in Figs. 2 and $4^a$. Therefore the pin $B^8$ must ride over the dog on its back stroke, and in so doing it depresses the catch H, causing arm $H^2$ to move the key lock-bar $c^2$ forward, thereby releasing the depressed key, which is immediately raised by its spring $c^4$, and the spring $c^3$ forces the key lock-bar outward, rocks arm $H^2$, and causes it to lift catch H into position to again catch pin $B^8$ unless one of the relative keys be depressed, as above described. Thus the depression of any key shifts the catch out of the way of pin $B^8$; but on the return movement of the segment the said pin through the catch resets the keys.

It is desirable at times to simultaneously depress all the catches H—for instance, when a wrong key has been depressed or when it is desired to print the total sum of the calculation. To do this, the shaft $H'$ is made a rock-shaft and is provided with a presser-bar $H^4$, extending above and across all the catches H. (See Figs. 4 and $4^a$). This bar is adapted to be engaged and depressed by the rod $H^5$, having its upper end hooked over the bar at $H^8$, (see Fig. 3,) and its lower end pivotally connected to one end of an oscillating lever $H^6$, fixed on a rock-shaft K, attached to the frame, the other end of lever $H^6$ being connected by a link $I^4$ to one end of a lever $I^3$, fulcrumed on pin $E'$, and to the free end of lever $I^3$ is pivoted the stem $I'$ of the "total" or "error" key I. As an error-key it is used to correct a wrong setting of the keyboard. If, for example, keys for nine hundred and seventy-five had been depressed, but before the shaft $d$ was rocked the operator discovered he wanted seven hundred and fifty-nine, by simply depressing key I the hook-levers H will be rocked, throwing their arms $H^2$ inward and forcing the key lock-bars inward, releasing the depressed keys, whereupon the operator can reset the keys correctly without any errors appearing in the registration. This key is used when it is desired to reset the disks at "0" or to obtain printed totals, as hereinafter explained, and for such use the lever $I^3$ is provided with a finger $i$, which is adapted to engage a pin $e^5$, attached to dog $e$, (see Fig. 18,) when the inner end of lever $I^3$ rises and turns said dog so that it will not engage cam $E^2$, and upon further depressing key I finger $i$ rocks the lever E so as to cause it to rock shaft $b'$ and cause arms $b$ to throw the segments into mesh with the pinions $A^2$ and hold the segments continually in mesh therewith, both during their forward and backward strokes, so long as the key I is depressed. At the same time the lever $I^3$ engages and moves an arm $a^5$ on the rock-shaft $a^4$, which is provided with a bowed rod $a^3$, underlying all the pawls $a\ a$, so that these pawls will be lifted out of mesh with pinions $A^2$ simultaneously with the throwing of segments B into mesh therewith by the depression of the total-key I. This is done to free the registering-disks, so they can be moved freely by the segments. The segments B being thus held in mesh with the registering-disks $A'$ and the latter being freed from the dogs $a$, the segments B and levers $B'$ are thrown forward by the springs rotating the registering-disks $A'$ backward until their motion is arrested by the impingement of their lugs $A^7$ against the arms $f$, which arrest the backward motion of the disks, and consequently the forward movement of the segments B, stopping the disks at the "0" point and also bringing the proper type to the printing-point, as hereinafter explained.

If the total-key I be released after the forward movements of the segment B, the latter will be dropped out of mesh with the registering-disks and may be returned to normal position out of mesh therewith, leaving the disks at starting or "zero" position.

The operation of printing totals will be hereinafter explained.

The machine is provided with a printing mechanism for recording each operation as follows: On the shaft $B^2$ beside each lever $B'$ is loosely pivoted a plate J, to which is attached a rearwardly-projecting arm $J'$, from the rear end of which is suspended a curved type-bar $J^2$, having a series of type characters "0" to "9" on their outer faces and a notch $J^3$ on its inner face opposite each type character. Each plate J is provided with a lug $j$ on its upper edge, which is adapted to be engaged by a dog $j'$, pivoted on the adjoining lever $B'$ so that when said lever moves forward it will carry the plate J along with it, and consequently raise bar $J^2$ more or less, according to the movement of the related and connected segment and bring the character on the type-bar (corresponding with the character which had appeared on the relative disk at the reading-point) into position for printing. The dogs $j'$ are normally held down in position to engage lugs $j$ on plates J by means of springs $j^2$, but when levers $B'$ on their return stroke reach the carry-over position the tails of the dogs engage a trip-bar $k$ on a rock-shaft K, which causes the dogs to rock to the position shown in Fig. 1 and hold them out of engagement with plates J. This allows the segments and levers to make their idle or carry-over strokes without disturbing plates J and their connected type-bars, because when the levers $B'$ again fall forward at the next operation of handle $d'$ the dogs $j'$ ride over notches $J^6$ in plates J without engaging same, and said dogs will not disengage trip-bar $k$ until they have passed notches $J^6$. (The manner of operating trip-bar $k$ to allow dogs $j'$ to engage notches $J^6$ in printing the totals is hereinafter described.) On the forward movement of the levers $B'$ the dogs disengage trip-bar $k$ and engage lugs $j$ in time to shift the type-bars properly, so that the type-numbers corresponding to the depressed-key numbers will be brought to the printing-point. When the type-bars have been lifted by the forward movements of the levers $B'$, as described, they are locked before the levers $B'$ return and during the movement of the levers by a lock-bar L, supported on short pivoted arms $L'$, one of which arms has a pin $L^2$, (see Fig. 3,) engaged by the forward end of an oscillating lever $l$, pivoted on a stud $l'$ on the side of the casing, the other arm of said lever extending toward shaft $d$ and carrying a dog $l^2$, which is adapted to engage a cam $l^3$ in shaft $d$, as shown. The dog is pivoted to the lever so that when shaft $d$ is rocked forward (during the setting of the type-bars) the dog yields and the lever $l$ is unaffected; but as soon as the shaft $d$ commences to move backward cam $l^3$ engages the dog, which locks against a pin $l^4$ on lever $l$. Consequently said lever is rocked, throwing plate L out and locking the type-bars in uplifted position and so holding them until the printing operation is performed, when the lever drops, permitting the type-bars to return to normal position. The printing occurs during the back strokes of levers B' and while the latter are moving backward, although the plates J and bars $J^2$ are stationary until the printing occurs, the dogs $j'$ sliding idly backward on the top edge of plates $j$ until the printing occurs.

Above the locking-plate L is a stationary bar $L^5$, against which the type-bars lie, and which supports them under the impact of the hammers during the printing operation.

The impressions are taken upon a narrow web of paper from the type by means of an interposed carbon-ribbon and impression-hammers M. There is a hammer M for each type-bar. These hammers are pivotally mounted on a shaft $M'$, and each is provided with a spring $M^2$, attached to a lug $M^3$, projecting from the hub of the hammer, and to a superimposed relatively fixed bar $M^4$, as shown. Each hammer is provided with a notched segment $M^5$ at base, which is engaged by a pawl $m$, pivoted on a cross-rod $m'$, said dog being connected to a pull-rod $m^2$, which extends inward to and beneath the shaft $B^2$ and is supported by a transverse bar $m^4$, as shown. The pawls $m$ are normally pressed against segments $M^5$ by means of springs $m^6$, attached to a fixed bar $m^7$. It will be seen by reference to Figs. 1 and 2 that the levers B' extend below shaft $B^2$ and below the inner ends of rods $M^2$ and are provided with pins $B^9$, which are adapted to engage hooks $m^8$ on rods $m^2$ just before the levers complete their return stroke and cause them to disengage pawls $m$ from hammers M, which are immediately thrown forward by their springs and take an impression from the type on bars $J^2$, as indicated in Fig. 1. As soon as the impression is taken cam $l^3$ disengages dog $l^2$, and the spring $l^5$ causes lever $l$ to rock locking-plate L away from the type-bars, and the latter being free immediately drop to the position shown in Fig. 1, their return being assisted by springs $J^6$, attached to plates J, and shaft $B^2$, as shown in Fig. 12. Upon the next forward movement of the levers B' the hammers are reset by means of the setting-bar N, which is operated by the rock-shaft $M'$, the latter being provided with an arm $N^2$, which engages a push-bar $N^3$, supported in guides $N^4$, attached to the frame, the inner end of bar $N^3$ lying in position to be contacted by stop-bar $d^2$ on shaft $d$, as shown in Figs. 1 and 2. The shaft $M'$ and bar N are thrown forward by a spring $N^6$, attached to the frame and to arm $N^2$, as shown.

The inking-ribbon and paper-feed devices may be of any suitable kind. One arrangement thereof is shown in the drawings. In this the paper is led from a supply-spool O over guide $o$, down between the hammers and type-bars, under guide $o'$, up to and over the feed-out rollers $o^3$ $o^4$, as shown. The ink-ribbon is led from a spool P, journaled in the main frame below the hammers, over suitable guides, up between the type and paper, to a second spool $p$, which is journaled in the frame above the type-bars. (See Figs. 1 and 2.) The ribbon may be shifted gradually by means of ratchets $P^2$, engaged by pawls $p^2$ on a shifting-bar $p^3$, which may be connected to and operated by push-bar $N^3$, as shown. This bar $p^3$ may be raised and lowered so as to shift the ribbon from one spool to the other in the manner of type-written-ribbon movements. The paper may also be shifted after each printing operation by means of pawl $p^6$, attached to bar $p^3$ and engaging a ratchet $o^6$ on the shaft of one of the rollers $o^3$. I do not, however, restrict myself to the particular construction or arrangement of ribbon and paper feeding mechanisms herein shown. Preferably the hammers M and the paper-web rollers and guides are supported in a secondary frame or boxing Q, (see Fig. 16,) pivoted within the main frame on shaft $M'$, so that releasing hook $Q^2$ the hammers and paper may be thrown back at any time for convenience in threading the web and ribbon and to permit the ready inspection at any time of the amount printed upon the web without having to withdraw it from the rollers $o^3$ $o^4$.

From the foregoing description it will be noted that each time the shaft $d$ is oscillated the segments are reciprocated the carry-over notch, as above described, and that if any key has been depressed the corresponding segments will be further moved to the extent permitted by the key. Say that key 5 had been depressed, the segment would move sufficiently to turn its relative disk A' five points. Such movement of the segment would through dog $j'$ and plate J move the related type-bar $J^2$, so as to bring type 5 thereon opposite the bar $L^5$, in which position it would be locked until the segment had almost completed its return stroke, when the segment-lever B' would through the proper described connections release the impression-hammer and take an impression from type 5 on the paper. Then the type is released and parts assume position shown in Fig. 1, ready for another operation.

When it is desired to print the total amount registered on the disks, it is necessary that the plates J should move simultaneously with the levers on their forward stroke—that is, that the type-bars should be moved during the carrying-over portion of the forward stroke of the levers. Therefore the lever $H^6$ is made fast to the shaft K, so that when total-key I is depressed the shaft K is rocked, so as to release the dogs $j'$ and permit them to at once engage notches $J^6$ in the plates J. Consequently the moment levers B start forward plates J move with them. Thus type-bars $J^2$ will be raised one more notch than they ordinarily would be, and they will bring into printing position the type corresponding with the numbers on the registering-disks so that the total will be printed. The "0" types are normally in position for printing, and consequently do not require to be moved into position for printing, leaving only nine figures on type-bars to be moved into position for printing. However in order to do the carrying over on the number-disk when necessary the segments must fall forward the tenth or carrying-over tooth in addition to the number of teeth that the depressed key permits. Where no keys have been depressed, the segments, nevertheless, move forward the tenth or carrying-over tooth whenever the handle is operated, and normally the dog $j'$, attached to lever $B'$, allows the segment to move one notch before it reaches the lug $j$ to raise the type-bar $J^2$. But in printing the total the tenth or carrying-over tooth, which is only in mesh when carrying over has to be done, (no carrying over occurring when total is being printed,) is immediately put in mesh with its wheel by depressing total-key. Consequently the lugs $A^7$ on the number-disks will reach their "0" stop before the type-bar has been raised into proper position for printing. In other words, when printing an item—say twenty-two—the segments fall forward (when handle is moved to forward stop) three notches, so as to bring carrying-over tooth into position for operation, to be ready, if necessary, to carry over one to next higher disk; but this movement only raises the related type-bars two notches, because such type-bars do not begin to move until dog $j'$ reaches $j$, and as the carry-over tooth is normally out of mesh the segments will move the number-disks two notches when handle is returned to normal position. However when printing a total of twenty-two the segments can fall forward only two notches, (the numbers on disks.) Therefore they must immediately take type-bars with them in order to bring the "22" into position for printing. The dogs $j'$ must, therefore, drop into notches $J^6$ when total-key is depressed and handle operated. In this operation the segments B are thrown into mesh with the registering-disks on both strokes, as above described, and the forward movement of the segments, and consequently the lifting of the related type-bars, is controlled by the amount of backward rotation of registering-disks $A^2$, which, as above explained, is limited in these operations by the impingement of lugs $A^7$ against the arms $f$ on levers F, which stop the registering-disks at "0," but after the segments B and levers $B'$ have moved forward sufficiently to bring the corresponding number on the related type-bars to the printing-point, and upon the back stroke of the segments an impression is taken from such type, and thus the total is recorded.

If it be desired to only ascertain a subtotal without resetting the disks at zero, then the total-key must be held down and keep segments B in mesh until they are returned to normal position, in which case the machine will record a subtotal and will continue its operations, starting with such subtotal as a basis. For instance, if nine hundred and seventy-three is the total calculated in the machine and the key I is depressed the segments B are thrown into mesh with the registering-wheels, and as the segments move forward the registering-wheels turn backward, as described, until lugs $A^7$ strike arms $f$, when the registering-wheels will be at zero, but the "units," "tens," and "hundreds" segments will have moved forward, respectively, nine, seven, and three points, and their connected printing-bars will have been shifted until the type "9," "7," "3" are brought opposite the printing-point. Now if the key I be released the segments B drop out of mesh with registering-disks $A^2$ and leave these disks all set at "0," (with lugs $A^7$ impinging against arms $f$;) but if key I be held down, keeping the segments in mesh with the wheels, the latter are rotated forwardly again upon the back stroke of the segments, so that at the next operation the disks start from the number "979" instead of from "0 0 0."

It will be observed by reference to Figs. 9 and 10 that each number or registering disk has two numbered flanges, one at each side of its pinion $A^2$. Each of these flanges bears the numerals "0" to "9;" but on one flange the numbers are set reversely to those on the other, and the "0" and "9" on one are respectively opposite the "9" and "0" on the other, and so on. This construction is to enable the machine to be used either in adding or multiplying, in which case one set of numbers on disks would be used, or for subtraction and division, in which case the other set of numerals on disks would be used. The sight-plate T of the machine, through which the numbers on disks are read, should be arranged to slide, so that the proper set of numbers would be readily distinguishable according to the operations being performed.

In multiplying operations it is desirable to keep the keys down without having to reset them for each additional operation. This can be conveniently accomplished by devices which will prevent the pins $B^8$ depressing catches H, and thus shifting the key lock-bars, as above described. In Figs. 3 and 4 I have shown a bar S, mounted on rocking levers $s$, lying below the ends of catches H and adapted to engage the tails $h^5$ of the dogs $h'$ on the catches H. One of the levers $s'$ is connected to the stem $S'$ of the setting-key $S^2$, and by depressing this key the bar S is rocked against the tails of the dogs, (see Fig. 4$^a$,) turning the latter down out of the path of pins $B^8$ on the levers $B'$. Consequently when the latter return to normal position the pins pass over the dogs and do not depress the catches. Consequently the key lock-bars are not released, and therefore so long as key $S^2$ is depressed the amount indicated by depressed keys can be repeated by simply rocking shaft $d$ for each adding operation. When key $S^2$ is released, a spring $s^3$ draws bar S away from the dogs $h'$ and the latter return to position to engage the pins $B^8$, as above described.

The structure and mode of operation of the machine will be sufficiently understood by those skilled in the art from the foregoing description. In practice I propose to use from four to eight registering-disks or number-wheels and their related actuating mechanism, according to the desired total capacity of the machine. I do not restrict myself to the specific constructions of parts shown therein, nor to the employment of all the parts and combinations in every machine. For example, in some machines the printing mechanism may be omitted, repeating in machines where such operations are not to be performed, and various changes can be made in the contour, size, form, and arrangements of parts by skilled mechanics within the scope of my invention.

The machine shown in the drawings is capable of use in adding, multiplying, dividing, and subtracting operations, and I will briefly explain one of each such operations as showing the capacity of the machine.

To add, press buttons representing item to be added. Then bring lever forward to stop and returned to normal position, which will print the item and restore keys ready for the next item. When total is to be printed, press down total-key and make one complete stroke of lever. This will print the total and leave total in the sight-rollers. To clear the machine, press total-key, bring lever forward to stop, then release total-key, and then return lever to normal position.

To multiply two hundred and sixty-nine by twenty-three, put "269" on keyboard. Then operate lever three times. This will add two hundred and sixty-nine three times, which is the same as multiplying it by three. Now restore the depressed keys by simply pressing key I. Then put "269" on keyboard thus: Put the "9" on second column of keys, the "6" on third, and the "2" on fourth column. Now operate lever twice. This will have the same effect as adding two hundred and sixty-nine twenty times, which is same as multiplying by twenty.

To divide, slide the sight-opening to the right, which will cover the figures used in adding and multiplying and expose those used in dividing and subtracting. To divide two hundred and sixty-eight by twenty-three, arrange number-disks to show "268" at sight-opening. To do which, proceed as follows: Press the "7" key in third column, the "3" key in second column, and the "1" key in first column, always using the key which added to the number you want to appear on sight-rollers will make nine. Now press the "9" keys in the rows to the left of the hundreds-column and make one complete stroke of lever. This will show the "268" in sight-windows and set the carrying device into proper position for minus operations. (Note in plus operations the carrying-lug on disks only acts after the disk has advanced nine numbers, whereas in minus operations the lug must be in position to act if only one number has been moved.) Now to divide the two hundred and sixty-eight by twenty-three put the "23" on keyboard as follows: Press the "2" in the third or hundreds column, and press the "3" in the second or tens column. The repeating-key "8" is now pressed down and locked, the lever is now operated once, and "38" will show in sight-windows. As the amount now showing in second and third windows is less than twenty-three, we now release the depressed keys by pressing error-key and put the "23" on keyboard over the "38" in windows. Thus put the "3" on first column, the "2" on second column. (The repeating-key should first have been released, as otherwise the depressed keys cannot be released.) Now press repeating-key and lock it and operate lever, and as less than twenty-three now shows in window the operation is complete. The answer is read thus: "11 5/23," one in the tens-column, one in the units-column, (one for each operation of lever,) and the "5" on roller is the remainder, and the depressed keys show the fraction.

To subtract, put the sum on the roller, same as for dividing, then put the sum to be subtracted on the keyboard, same as for adding, and operate lever once, when the answer will show at the sight-opening.

In all operations (excepting taking of totals) the registering-disks always rotate in the same direction, and the numbers on the disks for plus operations, such as multiplying and adding, read from "0" to "9," while the numbers on the disk for minus operations, such as subtracting and dividing, read from "9" to "0." Consequently, for example, if seven is to appear at the minus sight-opening the "2" key (whose "2" on the plus-column of the disk is opposite the "7" on the minus-column thereof) must be pressed, and this results in rotating the disk two teeth when the handle is operated, and "7" will appear at the minus sight-opening. The reason the "0" "0" are not opposite each other is because the lugs $A^7$, which effect or cause the carrying over to be done, (when the disks complete a revolution,) act only after the disk has advanced nine teeth in all plus operations, whereas in all minus operations the lug must act promptly at the beginning of the movement of the drum, and consequently the disk must be rotated nine teeth, which will bring the lug into position to act as soon as the disk is additionally advanced one or more teeth. For example, to subtract twenty-four from six hundred and thirty-two the "3" key in the third column, the "6" key in the second column, and the "7" key in the first column are depressed, and also all of the nine keys to the left of the depressed keys, to get carrying-lugs in position for minus operations. The handle is given one full stroke, and this will put "632" on the registering-disks, the sight-opening slide being moved to the right to bring the minus set of figures into view. The number to be subtracted is then put on the keyboard, same as for adding, and the handle operated once, and the answer will appear at the sight-openings.

In printing amounts the ciphers to the right should always appear. For instance, in print-five hundred the ciphers in the tens and units columns should be printed, but only the dog $m$ of the hundreds-hammer is released by the engagement of the hundreds-lever $B'$ with pull-rod $m^2$. The release of the dog $m$ of any hammer is, however, caused to effect the release of the dogs $m$ of the hammers of all lower denominations by the simple devices shown in Fig. 17, each dog $m$ being provided with a lateral pin $m^9$, adapted to engage the adjoining dog of the next lower denomination, and so on, so that the tripping of any dog will cause the tripping of all those to the right, (or lower denominations.) Thus a correct record is always obtainable.

Having thus described my invention, what I therefore claim as new, and desire to secure by Letters Patent thereon, is—

1. The combination of a numbered wheel or disk, a vibrating segment adapted to mesh therewith, a lever actuating said segment having a series of stop-lugs, and a series of keys adapted when depressed to engage certain lugs on the lever to limit the movement thereof.

2. The combination of a number-disk, its pinion, a vibrating lever, a segment pivotally connected to the lever, a rock-arm supporting said segment, and means for rocking said arm to throw the segment into mesh with the pinion, substantially as described.

3. The combination of registering-disks having pinions, vibrating levers carrying segments adapted to mesh with the pinions, a rock-shaft beside the levers, cams hung on said shaft and engaging said levers, and keys and connections for limiting the forward movements of the levers.

4. The combination of a number-disk, its pinion, a vibrating lever, a segment pivotally connected to said lever, and means for vibrating said segment on the lever to throw it into and out of mesh with the pinion; with keys for limiting the forward movement of the lever and segment, substantially as described.

5. The combination of a numbered wheel or disk, a vibrating lever, a segment pivotally connected to the lever, a rock-arm supporting said segment, and means for rocking said arm to throw the segment into mesh with the wheel, substantially as described; with a spring for throwing the lever forward, and a rock-shaft having a cam adapted to engage and retract the lever, substantially as described.

6. The combination of toothed disks, vibrating levers carrying segments adapted to mesh with the disks, a rock-shaft beside the levers, cams hung on said shaft and engaging said levers, and keys and connections for limiting the forward movements of the levers; with means for throwing the segments into mesh with the disks on the return stroke of the levers, substantially as described.

7. The combination of toothed number wheels or disks, vibrating segments adapted to mesh therewith and key-controlled means for limiting the forward movements of said segments; with means for throwing said segments into mesh with the wheels on either stroke at will, substantially as described.

8. The combination of a vibrating lever, a catch for holding said lever in normal position, keys for limiting the forward movement of the lever, the key lock-bar adapted to be shifted by the depression of a key, connections between said lock-bar and said catch whereby the catch is caused to release the lever when the key is depressed, substantially as described.

9. The combination of the toothed number-wheels, the segment adapted to mesh therewith, the rocking arm slidably supporting the front end of the segment, the vibrating lever pivotally connected to the rear end of the segment, and means for rocking said arm and vibrating said lever, for the purpose and substantially as described.

10. The combination of the toothed number-wheels, vibrating segments adapted to mesh therewith, and rocking arms for throwing said segments into and out of mesh; with the auxiliary tripping devices beside the wheels whereby when a number is to be carried over from one wheel to the next, the arm of said next wheel is automatically locked long enough to make its segment move the wheel, substantially as described.

11. The combination of toothed number-disks, vibrating segments adapted to mesh therewith, key-controlled means for limiting the forward movements of said segments, and means for throwing said segments into mesh with the disks on one stroke, and dropping them out of mesh on the termination of such stroke; with means whereby said segments may be thrown into and held in mesh with the wheels on both strokes, substantially as described.

12. The combination of the vibrating lever, the vibrating catch for holding said lever in normal position, the dog pivoted to said catch, the keys for limiting the forward movement of the levers, the key lock-bar adapted to be shifted by the depression of a key, connections between said lock-bar and said catch whereby the catch is caused to release the lever when the key is depressed, and a pin on the lever adapted to engage the dog on the catch and cause the latter to shift the key lock-bar and reset the keys, substantially as described and for the purpose set forth.

13. The combination of the registering-disks, vibrating segments adapted to mesh therewith, rocking arms supporting said segments and means for rocking said arms to throw the segments in mesh; with levers pivoted beside the disks adapted to be rocked by contact with "carrying-lugs" thereon, each lever having an arm depending beside the rocking arm supporting the segment and adapted when the lever is tripped by a carrying-lug to hold said arm up in position to keep the segment in mesh.

14. The combination of registering or number wheels or disks, vibrating segments adapted to mesh therewith, and devices for setting and holding said segments in mesh; with levers suspended beside the disks each having an arm adapted to be engaged by the "carrying-lug" of one disk, and another arm adapted to engage the segment-setting devices of an adjoining disk and keep the segment in mesh until the "carrying over" is effected; and means for returning the lever to normal position after such operation, substantially as described.

15. The combination of number wheels or disks, the vibrating segments adapted to mesh therewith, and devices for setting and holding said segments in mesh on one stroke; with levers suspended beside the disks, each having an arm adapted to be engaged by the "carrying-lug" of one disk, and another arm adapted to engage the segment-setting devices of an adjoining disk and keep such segment in mesh until the "carrying over" is effected, a dog for locking the levers during the "carry-over" operation, and means for returning the dog and lever to normal position after such operation, substantially as described.

16. In an adding-machine, the combination of a series of registering or number wheels, a corresponding series of vibrating segments, and levers supporting said segments; with a series of rocking cams beside the levers, each having a cam-slot engaged by a pin on the adjoining lever, and means for returning said cams and levers to normal position, substantially as described.

17. The combination of a series of registering disks or wheels, a series of vibrating segments, levers supporting said segments, a cam-plate loosely mounted beside each lever having a cam-slot engaging the adjoining lever, springs for throwing the cams and levers forward when the levers are released, and means for returning all the cam-plates, and levers, to normal position, the slots in the several cam-plates having dwells of successively greater length so that the levers will move the distance of the last tooth or notch of their return stroke in succession.

18. The combination of a series of registering disks or wheels, a series of vibrating segments, levers supporting said segments, a cam-plate loosely mounted beside each lever having a cam-slot engaging the adjoining lever, springs for throwing the cams and levers forward when the levers are released and means for returning all the cam-plates, and levers, to normal position, the slots in the several cam-plates having dwells of successively greater length so that the levers will move the distance of the last tooth or notch of their return stroke in succession; with means for throwing the segments into mesh with the wheel on their return stroke, and disengaging them from the wheels just before the completion of such stroke thereof, substantially as described.

19. In an adding-machine, the combination of a series of registering or number wheels, a corresponding series of vibrating segments, levers supporting said segments; with a rock-shaft beside the levers, a series of cam-plates, one for each lever, loosely mounted on said rock-shaft, each having a cam-slot engaged by a pin on the adjoining lever and springs for turning said cam-plates forward on the shaft when the levers are released, and means for returning said cams and levers to normal position, substantially as described.

20. The combination of a series of registering disks or wheels, a series of vibrating segments, levers supporting said segments, a rock-shaft beside the levers, a cam-plate loosely mounted on the rock-shaft beside each lever and having a cam-slot engaging the adjoining lever, springs for throwing the cams and levers forward when the levers are released, and a stop on the rock-shaft for returning all the cam-plates and levers to normal position, the slots in the several cam-plates having dwells of successively greater length so that the levers will move the distance of the last tooth or notch of their return stroke in succession, instead of simultaneously.

21. The combination of a series of registering disks or wheels, a series of vibrating segments, levers supporting said segments, a cam-plate loosely mounted beside each lever having a cam-slot engaging the adjoining lever, springs for throwing the cams and levers forward when the levers are released, and means for returning all the cam-plates, and levers, to normal position, the slots in the several cam-plates having dwells of successively greater length so that the levers will move the distance of the last tooth or notch of their return stroke in succession; with means for throwing the segments into mesh on one stroke with the wheels, and disengaging them from the wheels just before the completion of the return stroke, and auxiliary devices for keeping the segments in mesh during the final or "carry-over" movement in such return stroke, substantially as described.

22. The combination of a series of registering disks or wheels, a series of vibrating segments, levers supporting said segments, a rock-shaft beside the levers, a cam-plate loosely mounted on the rock-shaft beside each lever and having a cam-slot engaging the adjoining lever, springs for throwing the cams and levers forward when the levers are released, and a stop on the rock-shaft for returning all the cam-plates, and levers, to normal position, the slots in the several cam-plates having dwells of successively greater length so that the levers will move the distance of the last tooth or notch of their return stroke in succession, instead of simultaneously; with means for throwing the segments into mesh on one stroke with the wheels, and disengaging them from the wheels just before the completion of the return stroke, and auxiliary devices for keeping the segments in mesh during the final or "carry-over" movement of such return stroke, substantially as described.

23. The combination of a registering wheel or disk, a vibrating segment, a rock-shaft and connections for vibrating the segment; with a rocking arm supporting the segment, and a lever for rocking said arm to throw the segment in mesh with the wheel.

24. The combination of the registering wheels or disks, the vibrating segments for actuating the disks, a rock-shaft and connections for vibrating the segments, a series of catches for holding the segments in normal position; and a lever and connections for throwing the segments into mesh with the wheels substantially as described.

25. The combination of the registering wheels or disks, the vibrating levers, a rock-shaft and connections for operating said levers, key-controlled catches for said levers, and keys adapted when depressed to release the catches and limit the movement of the levers, and the segments pivoted to the levers adapted to be thrown into mesh with the wheels; a second rock-shaft, arms thereon supporting said segments and adapted to throw them into or out of mesh with the wheels; and a lever and connections for rocking said shaft from the first rock-shaft, all substantially as described.

26. The combination of a registering wheel or disk, a vibrating segment, keys for regulating the extent of movement thereof, and a rock-shaft and connections for vibrating the segment; with a rocking arm supporting the segment, a lever for rocking said arm to throw the segment in mesh with the wheel, and a cam on the rock-shaft for operating said lever, substantially as described.

27. The combination of the registering wheels or disks, the vibrating segments for actuating the disks, a series of catches for holding the segments in normal position, and a lever and connections for throwing the segments into mesh with the wheels; with a total-key and devices operated by the depression of said key whereby said lever is caused to throw and hold the segments in mesh, and whereby the segment-catches are simultaneously disengaged therefrom, substantially as described.

28. The combination of the registering wheels or disks, the vibrating levers, a rock-shaft and connections for operating said levers, key-controlled catches for said levers, keys adapted when depressed to release the catches and limit the movement of the levers, and segments pivoted to the levers adapted to be thrown into mesh with the wheels; a second rock-shaft, arms thereon supporting said segments and adapted to throw them into or out of mesh with the wheels, and a lever and connections for rocking said shaft from the first rock-shaft; with a key and connections whereby upon the depression of said key said segments are thrown and held in mesh with the gears and simultaneously the catches disengaged from the segments, substantially as described.

29. The combination of the registering-wheels, the oscillating segments for operating the wheels, and the vibrating levers operating said segments; with the plates pivoted beside the levers, the dogs on the levers engaging said plates to operate them when the levers move forwardly, and the type-bars moved by said plates, substantially as described.

30. The combination of the registering wheels or disks, the oscillating segments for operating the wheels, the vibrating levers operating said segments, the oscillating type-bars, mediate mechanism for shifting said bars from the levers, and impression-hammers and connections for setting the hammers upon the forward movement of the levers, and for releasing the hammers upon the return of the levers substantially as described.

31. The combination of the registering-wheels, the oscillating segments for operating the wheels, vibrating levers operating said segments, and the plates pivoted beside the levers; with dogs on the levers engaging said plates, the type-bars moved by said plates, and the stop-bars adapted to hold the dogs away from the plates on the return stroke of the levers.

32. The combination of the registering wheels or disks, the oscillating segments for operating the wheels, the vibrating levers operating said segments, the oscillating type-bars, mediate mechanism for shifting said bars from the levers, impression-hammers and connections for setting the hammers upon the forward stroke of the levers and releasing them upon the return of the levers substantially as described.

33. The combination of a series of registering-disks, a corresponding series of vibrating segments, levers supporting said segments, and means for throwing said segments into and out of mesh with the disks on either stroke thereof, substantially as described.

34. The combination of a series of registering-disks, a corresponding series of segments, means for vibrating said segments, and means for throwing them into and out of mesh with the disks; with means whereby the segments are moved simultaneously on their forward strokes, and means for causing them to complete their return strokes successively, substantially as described.

35. The combination of registering-wheels, oscillating levers and connections for shifting said wheels, the movable type-bars operated from said levers, the type-hammers opposite the bars, means for setting the hammers on the forward stroke of the levers, the dogs engaging the hammers, and connections whereby the levers cause the dogs to release the hammers, substantially as described.

36. The combination of the registering-wheels, the segments for operating the wheels, vibrating levers operating said segments, the swinging type-bars actuated from the levers, and means for locking said type-bars after the levers have made their forward stroke; with means for taking a record from the type upon the return stroke of the levers and subsequently restoring the parts to normal position, substantially as described.

37. The combination of a series of registering-disks, a corresponding series of vibrating segments, levers supporting said segments, and means for throwing said segments into and out of mesh with the disks; with means whereby the segments are caused to end their return strokes in succession, substantially as described.

38. The combination of a series of registering-disks, a corresponding series of segments, levers and connections for vibrating said segments, and means for throwing said segments into and out of mesh with the disks; with means whereby the segments are moved simultaneously on their forward strokes, means for bringing them into mesh on their return strokes, and means for causing them to complete their return strokes successively.

39. The combination of the registering-wheels, the oscillating levers and connections for shifting said wheels; the movable type-bars operated from said levers, the type-hammers opposite the bars, springs for actuating said hammers, the dogs engaging the hammers, and the pull-rods and connections whereby the levers cause the dogs to release the hammers, substantially as described.

40. The combination of the registering-wheels, the segments for operating the wheels, vibrating levers operating said segments, plates loosely pivoted beside the levers, dogs on the levers adapted to engage the plates when the levers move forwardly, the type-bars actuated from the plates, and means for locking said type-bars after the levers have made their forward stroke; with means for taking a record from the type, and means for subsequently restoring the parts to normal position, substantially as described.

41. The combination of the registering mechanism, the movable type-bars, and mechanism for shifting said bars by and from such registering mechanism; with a spring-actuated hammer opposite each type-bar, means for setting the hammers upon the actuation of the registering mechanism, means for feeding a strip of paper between the hammers and type-bars, and means for releasing the hammers to take an impression at each operation of the registering mechanism, substantially as described.

42. The combination of the registering-wheels, oscillating segments meshing therewith, and vibrating levers for actuating said segments; with plates pivoted beside said levers, movable type-bars connected to said plates, the dogs pivoted to the levers for engaging said plates, and the stop-bar for holding said dogs out of engagement with the plates in the normal position of the parts, substantially as described.

43. The combination of the registering-wheels, oscillating segments meshing therewith, and vibrating levers for actuating said segments; with plates pivoted beside said levers, movable type-bars connected to said plates, the dogs pivoted to the levers for engaging said plates, and the stop-bar for holding said dogs out of engagement with the plates in the normal position of the parts; with a series of spring-actuated impression-hammers, their locking-dogs, the pull-bars for disengaging said dogs adapted to be actuated by the vibrating levers, and means for feeding papers between the hammers and type-bar, all substantially as described.

44. The combination of the registering mechanism, the movable type-bars and mechanism for shifting said bars by and from such registering mechanism; a spring-actuated hammer opposite each type-bar, and means for feeding a strip of paper and an ink-ribbon between the hammers and type-bars; with means substantially as described for locking the type-bars in printing position, means for releasing the hammers to take an impression at each operation of the registering mechanism, and means actuated by the registering mechanism for subsequently resetting the hammers, substantially as described.

45. The combination of the registering-wheels, the oscillating segments meshing therewith, the vibrating levers for actuating said segments, the plates pivoted beside said levers, the movable type-bars connected to said plates, the dogs pivoted to the levers for engaging said plates, the stop-bar for holding said dogs out of engagement with the plates in the normal position of the parts, and means for causing said bar to release the dogs at the initial movement of the plates, substantially as described.

46. The combination of the registering-wheels, the oscillating segments meshing therewith, the vibrating levers for actuating said segments, the plates pivoted beside said levers, the movable type-bars connected to said plates, the dogs pivoted to the levers for engaging said plates, the stop-bar for holding said dogs out of engagement with the plates in the normal position of the parts, and means for causing said bar to release the dogs at the initial movement of the plates; with a series of spring-actuated impression-hammers, their locking-dogs, the pull-bars for disengaging said dogs adapted to be actuated by the vibrating levers, and means for feeding paper between the hammers and type-bars, all substantially as and for the purpose described.

47. The combination of registering mechanism, movable type-bars adapted to be shifted thereby, and means for locking said type-bars when shifted until an impression is taken; with spring-actuated impression-hammers opposite each type-bar, means actuated by the registering mechanism for setting said hammers, dogs for locking the hammers, and devices operated by the registering mechanism for releasing said dogs when an impression is to be taken, the dogs for the hammers of higher denominations being adapted to release hammers of lower denominations, substantially as described.

48. The combination of registering mechanism, a rocking plate operated therefrom, a type-bar suspended by said plate, and means for vibrating the latter; with a lock-bar for holding said type-bar in printing position, and means for shifting said lock-bar, substantially as described.

49. The combination of the registering-wheels, a vibrating lever and connections for operating the same; a vibrating-plate, connections for moving said plate from said lever, and a type-bar suspended from said plate; with an impression-hammer, a dog for locking said hammer, a pull-rod for releasing said dog, and a pin on the lever adapted to actuate said pull-rod, for the purpose and substantially as described.

50. The combination of a lever, a dog thereon, means for vibrating said lever, and a plate pivoted beside the lever having a notch and a tooth adapted to be engaged by said dog; with an arm attached to said plate, a type-bar suspended from said arm, and means for disengaging the dog from the plate when the parts are in normal position.

51. The combination of registering mechanism, a rocking plate operated therefrom, a type-bar suspended by said plate, means for vibrating said plate, a lock-bar for holding said type-bar in printing position, and means for shifting said lock-bar; with an impact-bar supporting the type-bars during impression, and spring-actuated impression-hammers, substantially as described.

52. The combination of the registering-wheels, a vibrating lever and connections for operating the same, a vibrating plate, and connections for moving said plate from said lever, a type-bar suspended from said plate, and means for locking said plate during the taking of an impression; with a spring-actuated impression-hammer, a dog for locking said hammer, a pull-rod for releasing said dog, and a pin on the lever adapted to actuate said pull-rod, for the purpose and substantially as described.

53. The combination of a registering-wheel, a segment adapted to mesh therewith, and a vibrating lever for operating said segment; with a rock-shaft beside the lever, a cam loosely mounted on the shaft, having a slot engaged by a pin on the lever, a spring connecting the cam to the shaft, and a stop-bar for returning the cam to normal position.

54. The combination of the depressible keys, with a vibrating lever thereunder having an enlarged head and lateral lugs on the head adapted to contact with the ends of depressed keys, substantially as described.

55. The combination of a registering-wheel, a segment adapted to mesh therewith, and a vibrating lever for operating said segment having an elongated head and laterally-projecting lugs thereon arranged at different distances from the pivot of the lever; with a rock-shaft beside the lever, a cam loosely mounted on the shaft having a slot engaged by a pin on the lever, a spring connecting the cam to the shaft, and the depressible keyed stops adapted to engage the lugs on the lever-head, substantially as described.

56. The combination of the keys and key lock-bar, the vibrating lever, a vibrating catch for said lever, and connections between said catch and lock-bar whereby the catch is caused to release the lever when a key is depressed; with a dog $h'$ pivoted to the end of the catch and adapted to be actuated by the lever on the return stroke thereof to cause the key lock-bar to release the keys, substantially as and for the purpose described.

57. The combination of a vibrating lever, stop-keys for limiting the calculating movement of said lever, the key lock-bar, the lever-catch indirectly connected to said lock-bar and adapted to allow a limited movement of the lever when no key is depressed and to release the lever when a key is depressed, and whereby when the lever returns to normal position the lock-bar is moved and the keys reset.

58. The combination of a vibrating lever, stop-keys for limiting the calculating movements of said lever, a key lock-bar, and a lever-catch connected to said lock-bar, whereby when a key is depressed the lever is released, and when the lever returns to normal position the lock-bar is moved and the keys reset, said catch permitting a carry-over movement of the lever when no key is depressed; with a "repeating-key" and connections whereby the catch may be prevented from releasing the lock-bar at the will of the operator, substantially as described.

59. The combination of the keys and key lock-bar, the vibrating lever, a vibrating catch for said lever, adapted to arrest the latter after it has made a "carry-over" stroke, and connections between said catch and lock-bar whereby the catch is caused to release the lever and permit further movement thereof when a key is depressed.

60. The combination of a toothed number-disk mounted on a laterally-immovable support or shaft, a vibrating segment, means for throwing the segment into mesh with the disk upon its return stroke, and disengaging it therefrom near the termination of such stroke, and means for positively returning said segment to normal position.

61. The combination of a numbered wheel, a key-controlled longitudinally-vibrating segment, and means for moving the segment laterally toward or from the wheel, adapted to throw the segment into mesh with the wheel upon its return stroke, and to disengage it from the wheel near the termination of such stroke; with a rock-shaft and connections for positively returning said segment to normal position.

62. The combination of a numbered wheel or disk, a vibrating lever having a series of stop-lugs, and a series of keys adapted when depressed to engage certain lugs on the lever to limit the movement thereof; with a segment actuated by said lever and means for holding the segment out of mesh with the wheel on its forward stroke, and for bringing it into mesh therewith on its return stroke, substantially as described.

63. The combination of register devices, movable type-bars adapted to be shifted by the register-actuating mechanism, and means for locking said type-bars when shifted until an impression is taken; with a spring-actuated impression-hammer opposite each type-bar, means actuated by the register-actuating mechanism for setting said hammers, dogs for locking the hammers, and devices operated by the register-actuating mechanism for releasing said dogs when an impression is to be taken, substantially as described.

64. In a register, a vibrating lever having an elongated head and laterally-projecting lugs thereon arranged at different distances from the pivot of the lever, in combination with a key-actuated stop adapted to engage the lugs, substantially as and for the purpose described.

In testimony that I claim the foregoing as my own I affix my signature in presence of two witnesses.

ALEXANDER C. SCHUMAN.

Witnesses:
ARTHUR E. DOWELL,
JAMES R. MANSFIELD.